Patented Oct. 17, 1922.

1,432,291

UNITED STATES PATENT OFFICE.

OSCAR HINSBERG, OF FREIBURG, GERMANY.

α-OXYARYL-SUBSTITUTED β-AMINOETHANES AND PROCESS OF MAKING SAME.

No Drawing.  Application filed September 13, 1921. Serial No. 500,459.

*To all whom it may concern:*

Be it known that I, OSCAR HINSBERG, a citizen of Germany, residing at Freiburg i/B, Germany, have invented certain new and useful Improvements in α-Oxyaryl-Substituted β-Aminoethanes and Process of Making Same, of which the following is a specification.

3, 4, dioxyphenyl-1-ethanolmethylamine and similar compounds have hitherto been produced according to the following methods:

1. By the action of chloracetylchloride upon phenols and subsequent action of ammonia or amine bases and reduction of the resulting amino-ketones.

2. By the reduction of cyanhydrines of the composition:

3. By the action of hippuric acid chloride or of phthalyl-glycyl-chloride upon phenol ether and a suitable after-treatment of the resulting benzoylaminoacetophenon derivatives and phthalimidoacidylphenol-alkyl ether. All these known manufacturing methods require a number of operations for arriving at the final product.

Now I have found a new and more simple process which consists in causing to act upon phenols, monovalent as well as polyvalent, aminoacetals of the formula:

wherein each R may stand for a hydrogen atom or any alkyl residue and each $R_1$ for an alcohol residue.

In presence of acids, such for instance as hydrochloric acid, sulfuric acid or glacial acetic acid the said compounds readily combine with elimination of alcohol so as to form bodies of the formula:

wherein each R may stand for a hydrogen atom or any alkyl residue, whereas each $R_2$ or at least one $R_2$ represents mono- or poly oxyaryl residue which may be substituted in any manner while the second $R_2$ may also stand for a hydroxyl group.

For the purpose of generically defining said bodies in the appended claims the following formula is employed:

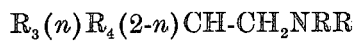

wherein each R may stand for a hydrogen atom or any alkyl residue, whereas $R_3$ represents a trioxyaryl residue and $R_4$ represents a hydroxyl group and $n$ represents a whole number less than 3, that is, either 1 or 2. Thus according to this formula the compound contains two trioxyaryl residues when $n$ is equal to 2 or the compound contains a trioxyaryl residue and a hydroxy group when $n$ is equal to 1.

When using monovalent phenols and their substitutions products the tendency to the formation of dioxyarylethan derivatives is generally greater, whereas when using polyvalent phenols there is a greater tendency to the formation of ϐ-amino-α-oxy-α-oxy-arylethane.

The products obtainable by the new process can be used as remedies or as intermediate products for the manufacture of such remedies.

EXAMPLES:

1. ϐAminoα-bis (4-oxyphenyl)-ethane.

4 gr. of aminoacetal and 8 gr. of phenol dissolved in glacial acetic acid are gradually mixed while stirring and cooling with 10–15 cc. of concentrated sulphuric acid. After having allowed the mixture to stand for several hours the thick reaction mass is run into water and neutralized with ammonia or sodium carbonate. The resulting base can be easily prepared in a pure state by filtering and redissolving from hot water.

The base separates from aqueous solutions in most cases in an amorphous state, from diluted alcohol in the form of granular crystals. Melting point about 95°/C. It is soluble in alcohol and water. The chloroplatinate crystallizes from water in the form of brownish yellow laminae which contain water of crystallization.

If only one molecular proportion of phenol is used there is obtained besides the primary base a second base which is difficultly soluble, this being probably the ethanol base.

2. Amino bis (4 Oxy-2-methyl-3-isopropylophenyl) ethane.

$(C_{10}H_{12}OH)_2CH\text{-}CH_2\text{-}NH_2$ 5 gr. of aminoacetal are dissolved with 10 gr. of thymol in 50 cc. of glacial acetic acid; there are then added 20–25 cc. of concentrated hydrochloric acid and the whole is heated for about 6 hours in the water bath. The solution is then diluted with water and reduced to a small volume by evaporation. The raw hydrochloride of the diarylethane base separates as a flaky precipitate. The latter is dissolved in hydrochloric acid for being purified and leaves then a slight residue whereupon it is isolated by evaporating the solution. The hydrochloride forms colourless needles which are moderately soluble in water, somewhat more difficultly soluble in hydrochloric acid. It has a bitter taste. From the acid solution the free base is eliminated in colourless needles, melting at 220°, by adding ammonia.

3. β-Amino-α-oxy-α (2 amino-4-oxyphenylethane).

5 g. of aminoacetal are mixed with 4, 6 g. of m—aminophenol and then dissolved by adding 20–30 cc. of strong hydrochloric acid. The solution is reduced to half its volume by evaporation at 20–30° C., there is then added again some hydrochloric acid and the solution is again evaporated until the solvent has disappeared. The residue consists substantially of the compound:

$C_6H_3(OH)(NH_2)CH(OH)CH_2NH_2.HCl.$

In order to purify it, the free base may be precipitated by means of ammonia, washed, again dissolved in hydrochloric acid and evaporated. A hydrochloride of a slight yellow colour is left which is readily soluble in water. By adding ammonia the free base is precipitated in flakes which are difficultly soluble and when exposed to the air easily become altered.

4. β Amino-α-oxy-α (o-dioxydiphenyl) ethane.

5 gr. of aminoacetal are dissolved with one molecule of pyrocatechol in strong hydrochloric acid (20 cc.). This solution is evaporated at 20–30° until it assumes the consistency of syrup. Thus a solution is obtained from which small quantities of a solid salt separate. This solid compound probably constitutes the hydrochloride of the amino-bis arylethane. The most part of the reaction product does not crystallize. From its aqueous solutions the free base is precipitated in colourless flakes by adding ammonia; these flakes assume a light brown colour when exposed to the air. The base after having been carefully washed with water and then dried melts at 190° while previously sintering. It is probably identical with the o-dioxy-phenylethanolamine described in example 2 of German Patent No. 193634.

5. β Amino-α-oxy-α-(trioxyphenyl) ethane.

$C_6H_3(OH)_3CH(OH)CH_2NH_2.$

Equal parts of aminoacetal and pyrogallol are dissolved in about six times their weight of strong hydrochloric acid. After the solvent has been partly evaporated at 20° C. there is again added concentrated hydrochloric acid (six times the quantity) and the whole is further evaporated. The reaction product, namely the hydrochloride of the above mentioned base, will separate after two weeks partly in the form of amorphous and partly in the form of colourless flakes. There is then added a further quantity of concentrated hydrochloric acid until there is no further separation; the remaining product is filtered, the precipitate dissolved in a small quantity of water and the pure hydrochloride is precipitated by adding alcohol and hydrochloric acid. It forms colourless needles which are readily soluble in water, difficultly soluble in alcohol and strong hydrochloric acid. The aqueous solution assumes a bluish-black colour on addition of ferric chloride. The free base which can be precipitated by ammonia, is very unstable and soon assumes a brown colour by oxidation in the air.

6. β Amino-α-oxy-α-(trioxyphenyl-carboxylic acid)-ethane.

$C_6H(OH)_3(COOH)CH(OH)CH_2NH_2.$ 10 g. of aminoacetal and 14 g. of gallic acid are dissolved in 200 cc. of glacial acetic acid, 60–70 cc. concentrated hydrochloric acid and 20 cc. of water. This solution is first heated for 12 hours to 25°, then during 10 hours in the water bath. The hydrochloride of the ethanol base separates already while hot in the form of crystals. In order to be purified it is recrystallized from water. Thus colourless crystals are obtained which are difficultly soluble in glacial acetic acid and hydrochloric acid, moderately soluble in water. The aqueous solution yields no precipitate on addition of ammonia in excess.

7. β Methylamino-α-oxy-α-(o-dioxyphenyl)-ethane and β methylamino-bis-α-(o-dioxyphenyl) ethane.

The reaction takes the same course as that indicated in example 4 by using methylaminoacetal instead of aminoacetal. When evaporating the reaction liquid part of the reaction product (about half its quantity) separates in the form of crystals. The product forms colourless needles which are readily soluble in water, difficultly soluble in strong hydrochloric acid and constitutes the hydrochloride of the bisarylethaneamine base. The portion of the reaction product which does not crystallize contains substantially "adrenaline" as it is proved by the melting point and the reactions of the base liberated by the addition of ammonia.

8. Diisoamylamino-α-oxy-α-(trioxyphenyl) ethane.

When proceeding as indicated in example 5 and using N-diisoamylaminoacetal, which is readily obtained by heating one molecular proportion of chloracetal with two molecular proportions of diisoamylamine to 150°, the above named compound is obtained in the form of its hydrochloride. It forms colourless or slightly grey needles, which are pretty readily soluble in water, difficultly soluble in concentrated hydrochloric acid. The free base is precipitated in the form of a flaky precipitate by adding ammonia.

9. β Amino-α-bis (2-oxynaphtyl) ethane.

5 gr. of aminoacetal in 10, 5 g. of β-naphthol dissolved in 40 cc. of glacial acetic acid, are mixed while cooling with 15 cc. of concentrated hydrochloric acid. This mixture is allowed to stand for 5 days at room temperature and there is then added to the crystalline magma strong hydrochloric acid until the product of the reaction has completely separated. By filtering and washing with glacial acetic acid and hydrochloric acid the product becomes pure. It forms colourless needles which are moderately soluble in water, readily soluble in glacial acetic acid; its acetic solution is precipitated by adding HCl. From its aqueous solution the free base is precipitated by adding ammonia. Melting point about 124°.

10. 5 g. of the sodium salt of 1-oxynapthaline 8-sulfonic acid are dissolved together with 2 g. of aminoacetal in as small a quantity of hot water as possible. There are then added 80 cc. of concentrated hydrochloric acid and the whole is heated in the water-bath for 6 hours. The product of the reaction separates almost completely in the form of light reddish crystals. By washing with water it becomes free from chlorine. It is difficultly soluble in cold water, readily soluble in hot water; also readily soluble in ammonia and caustic soda lye. Its melting point is over 250°. As the reagents are wholly consumed it is very probable that to the compound the following formula must be attributed—

$C_{10}H_5(OH)(SO_3H)CH(OH)CH_2NH_2$.

When using two molecular proportions of naphtholsulfonic acid upon one molecular proportion of aminoacetal a compound is obtained which is more readily soluble.

In the appended claims I have employed the expression "aliphatic substituents" to designate hydrogen as well as the alkyl groups. The expression "phenols" employed in the claims designates the monovalent as well as polyvalent phenols either unsubstituted or substituted in any manner.

It is also to be understood that the expression "oxyaryl residue" employed in the claims designates all such compounds including the mono and poly oxyaryl residues either unsubstituted or substituted in any manner and that the expression "a trivalent phenol residue" designates such compounds either unsubstituted or substituted in any manner.

Having now described my invention, what I claim is:

1. As a new process, the manufacture of A-oxyaryl-substituted B-aminoethanes by causing phenols to act upon aminoacetals of the general formula: $CH_2NRRCHR_1R_1$ wherein each R represents an aliphatic substituent and each $R_1$ represents an alcohol residue.

2. As new products, bodies having the general formula:

$R_3(n)R_4(2-n)CH-CH_2-NRR$, wherein each R represents an aliphatic substitent and $R_3$ represents a trioxyaryl residue and $R_4$ represents a hydroxyl group and n represents a whole number less than 3.

3. As new products, the bodies of the general formula:

$R-CH(OH)CH_2NH_2$, wherein R represents a trihydroxy phenyl group, the hydrochlorides of said bodies being colorless crystalline bodies which are soluble in water and difficultly soluble in strong hydrochloric acid.

In testimony whereof, I affix my signature.

Dr. OSCAR HINSBERG.